(12) United States Patent
Camasmie et al.

(10) Patent No.: US 9,981,711 B2
(45) Date of Patent: May 29, 2018

(54) SUSPENDED SPINDLE ASSEMBLY FOR RECUMBENT TRICYLES

(71) Applicants: Paulo Camasmie, Winter Park, FL (US); Justin Calla, Maitland, FL (US)

(72) Inventors: Paulo Camasmie, Winter Park, FL (US); Justin Calla, Maitland, FL (US)

(73) Assignee: Big Cat Human Powered Vehicles, LLC, Orlando, FL (US)

( * ) Notice: Subject to any disclaimer, the term of this patent is extended or adjusted under 35 U.S.C. 154(b) by 4 days.

(21) Appl. No.: 15/242,738

(22) Filed: Aug. 22, 2016

(65) Prior Publication Data

US 2018/0050757 A1 Feb. 22, 2018

(51) Int. Cl.
| | |
|---|---|
| *B62K 25/00* | (2006.01) |
| *B62K 21/08* | (2006.01) |
| *B62K 5/02* | (2013.01) |
| *B62K 5/05* | (2013.01) |
| *B62K 3/00* | (2006.01) |
| *B60G 3/28* | (2006.01) |
| *B62K 5/00* | (2013.01) |

(52) U.S. Cl.
CPC .............. *B62K 25/00* (2013.01); *B62K 3/005* (2013.01); *B62K 5/02* (2013.01); *B62K 21/08* (2013.01); *B60G 3/285* (2013.01); *B60G 2200/10* (2013.01); *B60G 2206/50* (2013.01); *B60G 2300/122* (2013.01); *B62K 5/05* (2013.01); *B62K 2005/001* (2013.01)

(58) Field of Classification Search
CPC ........ B62K 25/00; B62K 25/04; B62K 21/08; B62K 3/005; B62K 2005/001; B62K 5/02; B62K 5/05; B60G 2300/12; B60G 2300/122; B60G 2206/50; B60G 3/285; B60G 2200/10; F16F 1/36
See application file for complete search history.

(56) References Cited

U.S. PATENT DOCUMENTS

| | | | | |
|---|---|---|---|---|
| 4,175,764 A | * | 11/1979 | Johnson ............... | B62K 25/286 267/173 |
| 4,463,964 A | * | 8/1984 | Takayanagi ........... | B62K 5/027 180/215 |
| 4,497,506 A | * | 2/1985 | Miyakoshi ........... | B62K 25/286 280/124.105 |
| 4,579,189 A | * | 4/1986 | Tanaka ................. | B62K 25/286 180/227 |
| 4,913,255 A | * | 4/1990 | Takayanagi .......... | B62K 25/286 180/227 |
| 5,409,249 A | * | 4/1995 | Busby .................... | B62K 25/30 280/284 |
| 5,496,052 A | * | 3/1996 | Tamaishi ............... | B62K 19/18 267/293 |

(Continued)

FOREIGN PATENT DOCUMENTS

| | | |
|---|---|---|
| CN | 102815360 A | 12/2012 |
| CN | 203142939 U | 8/2013 |

(Continued)

*Primary Examiner* — Laura Freedman
(74) *Attorney, Agent, or Firm* — GrayRobinson, P.A.; Thomas L. Kautz (57) ABSTRACT

A suspended spindle assembly is disclosed for each of the front wheels of recumbent tricycles which absorb vibration and bumps to reduce rider fatigue while improving trike handling and rider comfort.

26 Claims, 6 Drawing Sheets

(56) References Cited

U.S. PATENT DOCUMENTS

| | | | | |
|---|---|---|---|---|
| 5,505,481 A * | 4/1996 | VanDenberg | ............ | B60G 11/27 |
| | | | | 280/124.157 |
| 5,540,454 A * | 7/1996 | VanDenberg | ............ | B62D 61/12 |
| | | | | 180/209 |
| 5,649,693 A * | 7/1997 | Busby | ............ | B62K 25/04 |
| | | | | 267/140.13 |
| 6,149,169 A * | 11/2000 | Chelgren | ............ | A61G 5/10 |
| | | | | 280/647 |
| 6,203,042 B1 * | 3/2001 | Wilcox | ............ | B62K 25/286 |
| | | | | 280/275 |
| 6,203,043 B1 * | 3/2001 | Lehman | ............ | B62K 3/005 |
| | | | | 280/124.136 |
| 6,425,161 B1 * | 7/2002 | LeMeur, Jr. | ............ | B60B 33/045 |
| | | | | 16/44 |
| 6,532,623 B1 * | 3/2003 | Watanabe | ............ | B60B 33/0007 |
| | | | | 16/35 D |
| 7,128,327 B2 * | 10/2006 | Kawamata | ............ | B60G 7/006 |
| | | | | 267/257 |
| 7,364,000 B2 * | 4/2008 | Furukawa | ............ | B62K 25/283 |
| | | | | 180/227 |
| 8,602,428 B2 * | 12/2013 | Swist | ............ | B60G 3/06 |
| | | | | 280/124.136 |
| 8,720,922 B2 * | 5/2014 | VanDenberg | ............ | B60G 9/003 |
| | | | | 267/273 |
| 8,888,113 B2 * | 11/2014 | Dyar | ............ | B62K 25/04 |
| | | | | 280/124.11 |
| 9,216,763 B2 * | 12/2015 | Huntzinger | ............ | B60G 3/08 |

FOREIGN PATENT DOCUMENTS

| | | |
|---|---|---|
| JP | 2006-341723 A | 12/2006 |
| WO | 1987/01670 A1 | 3/1987 |
| WO | 2012/160323 A2 | 11/2012 |

* cited by examiner

SUSPENDED SPINDLE ASSEMBLY FOR RECUMBENT TRICYLES

FIELD OF THE INVENTION

This invention relates to spindle assemblies, and, more particularly, to a suspended spindle assembly for use in recumbent tricycles.

BACKGROUND OF THE INVENTION

Tadpole recumbent tricycles generally comprises a frame coupled to a single rear wheel and two smaller front wheels with a seat located between them. Each front wheel is joined to the frame by a spindle assembly connected between the axle of the wheel and the head tube of the frame. The spindle assemblies function to couple the front wheels to the handlebars and steering mechanism of the recumbent tricycle.

Typically, recumbent tricycles have no structure for absorbing vibration and/or shock resulting from engagement of the wheels with the road surface and with any bumps or other obstacles that may be encountered while riding. Conventional spindle assemblies are rigidly connected between each front wheel and the frame such that the rider feels essentially everything that the wheels contact during a ride. This can create fatigue of the hands and arms while operating the steering mechanism, and overall rider discomfort.

SUMMARY OF THE INVENTION

This invention is directed to a suspended spindle assembly for each of the front wheels of recumbent tricycles which absorb vibration and bumps to reduce rider fatigue while improving trike handling and rider comfort.

In the presently preferred embodiment, each spindle assembly comprises a spindle body fixed to the steerer tube of the trike frame and an axle body connected to the trike axle which mounts a wheel carrying a tire. A rearward end of the axle body is pivotally mounted to a rearward end of the spindle body, and a linkage assembly connects their forward ends. The axle body is pivotal in a direction toward and away from the spindle body in response to engagement of the trike with a road surface, bumps or other obstacles, and, during braking of the trike. A shock absorbing body extends from the axle body to the spindle body, at a location between their rearward ends and the linkage assembly, which is effective to absorb vibration and shock transmitted thereto via pivotal movement of the axle body.

One aspect of this invention is predicated on the many advantages provided by positioning a shock absorbing body between a fixed spindle body and pivotal axle body. Preferably, the shock absorbing body is a block of cellular polyurethane elastomer, described in more detail below, which exhibits progressive compression behavior and is commercially available in different densities. In response to the application of a compressive force by the axle body when it pivots toward the spindle body, the length dimension of the shock absorbing body is reduced. In this context, "length" refers to a dimension measured in a direction between the spindle body and axle body. The shock absorbing body preferably undergoes a pre-compression, in a manner described below, to facilitate assembly and to maximize its shock absorbing performance. Additionally, a different density of material forming the shock absorbing block may be selected depending on rider weight. After the shock absorbing body is pre-compressed, vibration, shock or other inputs transmitted from the road, tire, wheel and axle to the axle body are substantially absorbed by further compression and reduction in length of the shock absorbing body as the axle body is pivoted toward the spindle body. The same structural element that applies pre-compression to the shock absorbing body, described below, also functions to prevent engagement of the axle body with the linkage assembly of the spindle assembly.

In another aspect of this invention, the pivotal connections between the spindle body and axle body, and between the linkage assembly and each of the spindle and axle bodies, assist in maintaining the wheel and tire of the trike at a neutral camber, i.e. such that the wheel plane of motion of each front tire is substantially perpendicular to the ground surface when viewed from the back of the trike. This is achieved by disposing the axes of rotation, about which the elements noted above pivot, in an orientation which is substantially parallel to the ground surface and perpendicular to the wheel plane of motion.

Torsional rigidity of the trike during cornering is enhanced by the pivotal connection between the spindle body and axle body, and also the configuration of the linkage assembly. Preferably, the axle body is pivotally connected to the spindle body by a shaft which is rotatable within two spaced bearings located in a bore formed in the axle body. The linkage assembly comprises a four-bar linkage arrangement including an upper link having spaced arms which are pivotally connected to the spindle body, and a lower link having spaced arms which are pivotally connected to the axle body. The spaced au is of the upper and lower links are pivotally mounted to one another.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE PREFERRED EMBODIMENT

Figure 1:
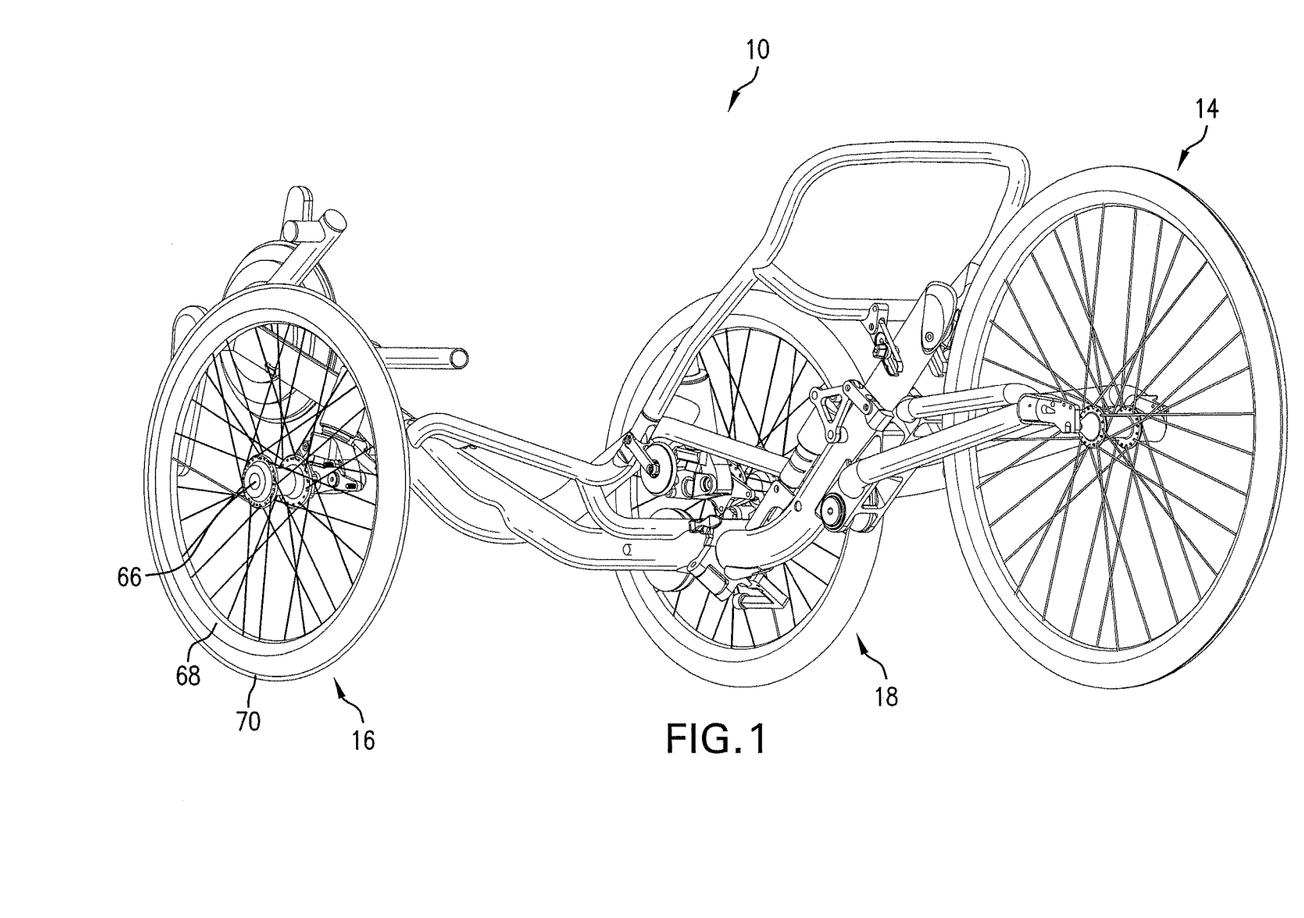
FIG. 1 is a perspective view of a recumbent tricycle incorporating the suspended spindle assembly of this invention on each of the front wheels.
Figure 2:
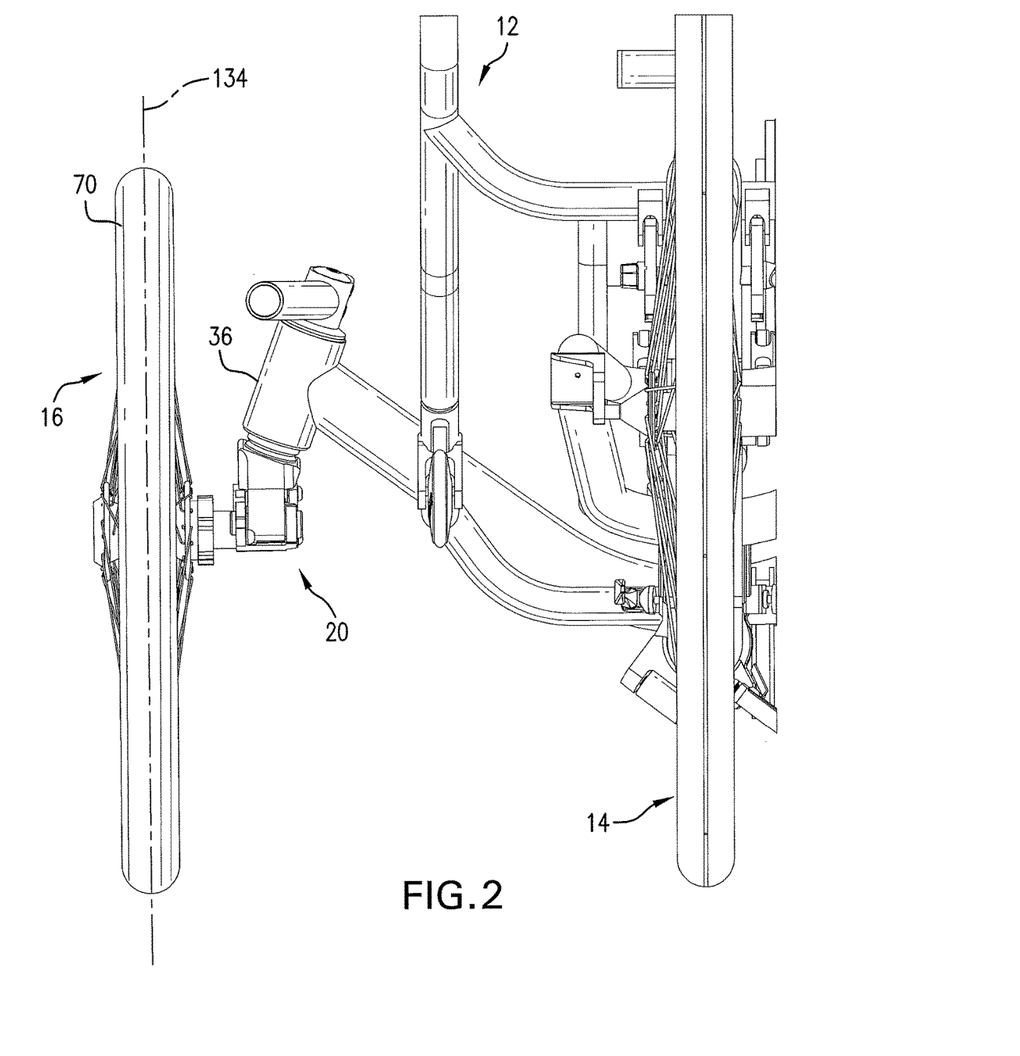
FIG. 2 is partial rear view of the tricycle illustrated in FIG. 1 depicting the rear wheel and one of the front wheels.

Referring initially to FIGS. 1 and 2, a recumbent tricycle 10 is illustrated which comprises a frame 12 coupled to a rear wheel assembly 14 and two front wheel assemblies 16, 18. Details of the construction of the tricycle 10 form no part of this invention and are therefore not described herein. For purposes of the present discussion, the term "rearward" refers to a direction toward the rear wheel assembly 14 and "forward" denotes the opposite direction toward the front wheel assemblies 16, 18. Additionally, "upward," "downward," "upper" and "lower" denote spatial orientations of the tricycle 10 relative to a ground surface on which it rests when in use.

This invention is directed to a suspended spindle assembly 20, one of which is connected to each of the front wheel assemblies 16, 18. The two spindle assemblies 20 are identical in structure and function, and therefore only one of which is described in the discussion which follows.

Figure 3:
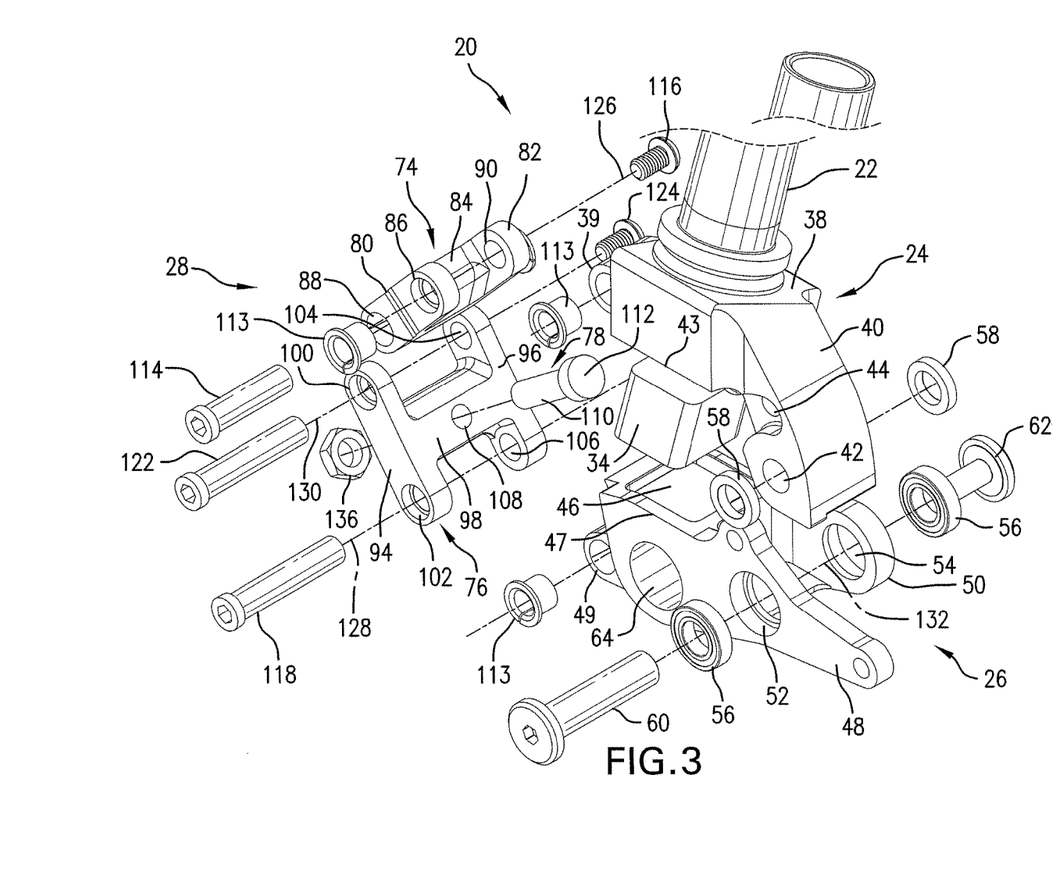
FIG. 3 is an exploded perspective view of a suspended spindle assembly of this invention.

Referring now to FIG. 3, the spindle assembly 20 generally comprises a steerer tube 22, a spindle body 24, an axle body 26, a linkage assembly 28 and a shock absorbing body 34 positioned between the spindle body 24 and axle body 26. Each of these components, and their interrelationship, is described in detail below.

The spindle body 24 is preferably press fit into a lower end of the steerer tube 22 and welded in place. In turn, the opposite, upper end of the steerer tube 22 is received within a head tube 36 which is part of the trike frame 12. See FIG. 2. The steerer tube 22 rests atop a forward portion 38 of the spindle body 24, and a leg 40 extends rearwardly and downwardly from the forward portion 38. A hollow sleeve 39 extends from the forward-most surface of the forward portion 38 for connection to the linkage assembly 28, as discussed below. The forward portion 38 has a seat (not shown) for receiving the shock absorbing body 34 as discussed below, and that seat has an outer edge 43. Additionally, the leg 40 of the spindle body 24 is formed with a hole 44, in between the forward portion 38 and bore 42, which functions as a tool access hole for the brake hardware of the tricycle 10 (not shown).

The axle body 26 is formed with a seat 46, a pair of spaced arms 48 and 50 extending rearwardly from the seat 46, an outer edge 47 and a forward-most surface which mounts a hollow sleeve 49 for connection to the linkage assembly 28 as described below. Each of the arms 48, 50 is formed with a bore 52, 54, respectively, within which a ball bearing 56 is press fit. The arms 48, 50 essentially define a yoke and may be positioned relative to the spindle body 24 such that they extend on the outside of leg 40 such that their bores 52, 54 align with the through bore 42. Preferably, a bearing spacer 58 is positioned in between each of the arms 48, 50 and the abutting surface of the leg 40 of the spindle body 24, and then a pivot shaft 60 is inserted through the two ball bearings 56. The pivot shaft 60 is held in place by a pivot bolt 62. Forwardly of the pivot shaft 60 and beneath the seat 46, the axle body 26 is formed with an axle bore 64 which mounts the axle 66 of the tricycle 10. A wheel 68 is connected to the axle 66, and a tire 70 is mounted on the wheel 68. See FIG. 1.

The spindle body 24 is fixed to the frame 12 of the tricycle 10 as described above, but the connection of axle body 26 to the spindle body 24 via the pivot shaft 60 allows the axle body 26 to pivot relative to the spindle body 24. The axle body 26 is essentially "suspended" from the spindle body 24 due to such pivotal connection and its seat 46 is movable toward and away from the forward portion 38 of the spindle body 24 in response to upward and downward movement of the axle 66 as the tire 70 travels along a road, over a bump or in the course of braking of the tricycle 10.

An important aspect of the spindle assembly 20 of this invention is its capacity to absorb vibration and shock transmitted by the tire 70 and wheel 68 to the axle 66 before reaching the rider. This is accomplished by the inclusion of the shock absorbing body 34 positioned between the seat 46 of the axle body 26 and the forward portion 38 of the spindle body 24. In the presently preferred embodiment, the shock absorbing body 34 is a block of cellular polyurethane elastomer commercially available under the registered trademark Cellasto® from BASF Polyurethanes GmbH of Lemfoerde, Germany. This material exhibits progressive spring behavior, is suitable for use in confined spaces and is available in different densities. Preferably, densities of 450 kg/m$^3$ (Cellasto® MH24-45) and 550 kg/m$^3$ (Cellasto® MH23-55) may be employed in the shock absorbing block 34 of the spindle assembly 20 of this invention. The choice of density is selected according to the weight of a given rider, i.e. the higher density Cellasto® noted above may be employed for heavier riders.

Referring to the left-hand side of FIG. 3, the linkage assembly 28 is illustrated in detail. The linkage assembly 28 comprises an upper link 74, a lower link 76 and a bumper element 78. The upper link 74 includes spaced side plates 80 and 82 extending from a center plate 84. The upper end of side plate 80 is formed with a bore 86, the upper end of side plate 82 is formed with a bore 90 and the center plate is formed with a bore 88. The lower link 76 includes spaced side plates 94 and 96 connected to one another by a center plate 98. Each end of the side plate 94 is formed with a bore 100, 102, respectively, and aligning bores 104, 106 are formed on the opposite ends of side plate 96. The center plate 98 of lower link 76 has an internally threaded bore 108 which receives one end of a threaded shaft 110 of bumper element 78. A head section 112 formed of a resilient material such as rubber is mounted to the opposite, free end of the bumper element 78. See also FIGS. 4-8.

In the presently preferred embodiment, bushings 113 are press fit into each end of the sleeve 39 on the forward portion 38 of the spindle body 24, and bushings 113 are press fit into opposite ends of the sleeve 49 extending from the seat 46 of the axle body 26. Only one bushing 113 for each sleeve 39, 49 is shown in FIG. 3. The upper end of the spaced side plates 80, 82 of the upper link 74 straddle the hollow sleeve 39 such that the bore 86 in side plate 80 and the bore 90 in side plate 82 align with the hollow sleeve 39. A pivot shaft 114 is inserted through the aligning bores 86, 90 and hollow sleeve 39, and into the bushing 113, where it is held in place by a screw 116. The lower link 76 is mounted in a similar fashion to the axle body 26. The lower end of the spaced side plates 94, 96 of lower link 76 straddle the hollow sleeve 49 such that the bores 102, 106 therein align with the hollow sleeve 49. A pivot shaft 118 is inserted through the aligning bores 102, 106 and hollow sleeve 49, and into the bushing 113, where it is held in place by a screw (not shown). Assembly of the linkage assembly 20 is completed by pivotally mounting the upper and lower links 74, 76 to one another. Preferably, the side plates 94, 96 of the lower link 76 straddle the center plate 84 of the upper link 74 such that the bores 100 and 104 of the lower link 76 align with the bore 88 formed in the center plate 84. Bushings 113 are press fit into opposite ends of bore 88, one of which is shown in FIG. 3, and such bore 88 receives a pivot shaft 122 held in place by a screw 124.

The linkage assembly 20 is pivotal in response to pivoting of the axle body 26 relative to the spindle body 24. The spaced side plates 80, 82 of the upper link 74 and the spaced side plates 94, 96 of the lower link 76 form essentially a 4-bar linkage which improves torsional rigidity of the spindle assembly 20, especially while the tricycle 10 is cornering. Pivot points are provided along axes defined by the pivot shaft 114 which connects the upper link 74 to the spindle body 24, by the pivot shaft 118 which connects the lower link 76 to the axle body 26, and, by the pivot shaft 122 which connects the upper and lower links 74, 76 to one another. These three axes, schematically depicted by respective lines 126, 128 and 130 in FIG. 3, together with the axis 132 of the pivot shaft 60 which connects the axle body 26 to the spindle body 24, are oriented substantially parallel to one another and to the ground on which the trike 10 travels. This construction of the spindle assembly 20 causes the camber of the wheel 68 and tire 70 to remain substantially neutral even as the axle body 26 pivots relative to the spindle body 24, i.e. the wheel plane of motion, represented by the line 134 on the tire 70 in FIG. 2, remains substantially perpendicular to the ground.

Figure 4:
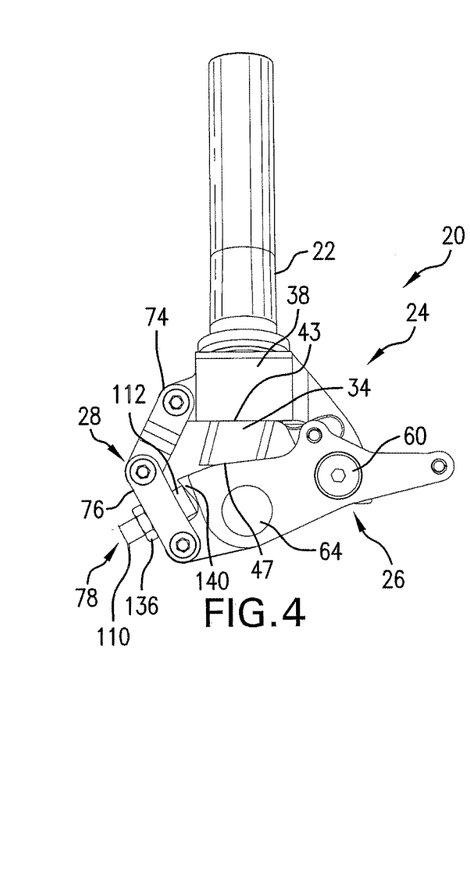
FIG. 4 is a side view of the assembled suspended spindle assembly shown in its initial assembly position.
Figure 5:
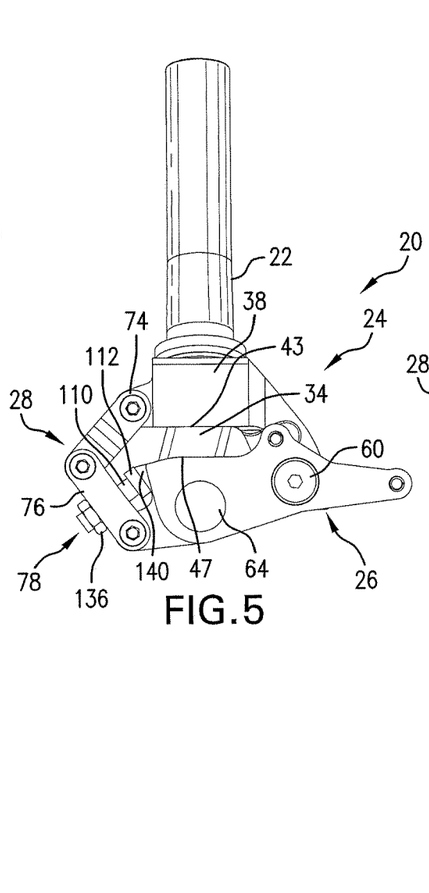
FIG. 5 is a view similar to FIG. 4 except with the spindle assembly pre-compressed.

Referring now to FIGS. 4-8, the function of the bumper element 78 and performance of the shock absorbing body 34 are illustrated in more detail. As noted above, the bumper element 78 has a threaded shaft 110 which may be inserted in the internally threaded bore 108 in the center plate 98 of the lower link 76. FIG. 4 illustrates the linkage assembly 28 in an assembled position with the upper link 74 pivotally mounted to the spindle body 24, the lower link 76 pivotally mounted to the axle body 26 and the upper and lower links 74, 76 pivotally mounted to one another. Preferably, the shock absorbing body 34 is fully extended at this juncture and the head section 112 of the bumper element 78 rests against an angled extension 140 on the forward surface of the forward portion 38 of axle body 26 as depicted in FIG. 4. In this position, the seat 46 of the axle body 26 and shock absorbing body 34 are oriented at an angle relative to the forward portion 38 of the spindle body 24. This is evident by the relative position of the outer edge 47 of the seat 46 in axle body 26 and the outer edge 43 of the forward portion 38 of the spindle body 24 as seen in FIG. 4. In order to obtain the full travel potential of the shock absorbing body 34, i.e. a reduction of its length under a compression load, it is desirable to orient the outer edge 47 of the seat 46 in the axle body 26 substantially parallel to the outer edge 43 of the seat in the forward portion 38 of the spindle body 24. This is achieved in the spindle assembly 20 of this invention by applying a pre-compression to the shock absorbing body 34 via the bumper element 78. As shown in FIG. 5, the bumper element 78 may be rotated within the threaded bore 108 of lower link 76 to extend in a direction toward the axle body 26. The end of the bumper element 78 opposite head section 112 is formed with a recess (not shown) which receives a torx driver to rotate it. The bumper element 78 forces the body 26 toward the spindle body 24, which, in turn, compresses the shock absorbing body 34 between them to reduce its length. Preferably, the shock absorbing body 34 is compressed approximately twenty percent (20%) of its length, such that the distance between the outer edge 43 of forward portion 38 of spindle body 24 and the outer edge 47 of the seat 46 of axle body 26 is approximately 11.92 cm. In this position, shown in FIG. 5, the outer edges 43, 47 are substantially parallel to one another, and the head section 112 of the bumper element 78 rests flush against (parallel to) the angled extension 140 of the axle body 26. This optimizes shock absorption of the bumper element 78 on the return trajectory, e.g. when the axle body 26 moves away from the spindle body 74 or when the brakes are applied because the entire surface area of the resilient head section 112 of the bumper element 78 engages the angle extension 140. The bumper element 78 is retained in the positions illustrated in FIGS. 4 and 5 by affixing a nut 136 at the end of its threaded shaft 110.

Figure 6:
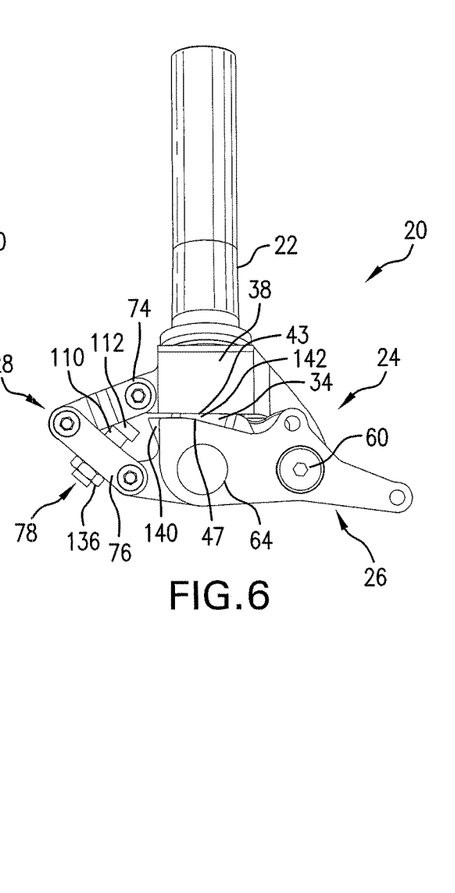
FIG. 6 is a view similar to FIG. 4 except showing the assembly in a fully compressed position.

FIG. 6 illustrates the relative position of the spindle body 24, the axle body 26 and the linkage assembly 28 in a fully compressed position. As noted above, the Cellasto® material forming the shock absorbing body 34 exhibits progressive spring behavior and becomes so stiff in compression that even at the point a full compression depicted in FIG. 6 there is nevertheless a space 142 between the spindle body 24 and axle body 26 and they do not contact one another. Another important function of the bumper element 78 is to limit the extent of travel of the lower link 76 relative to the axle body 26. As seen in FIG. 6, the upper and lower links 74, 76 of linkage assembly 28 move toward and away from one another in a scissors-type action as the axle body 26 pivots toward and away from the spindle body 24. When rebounding from engagement with a bump or after braking, such that the upper and lower links 74, 76 of linkage assembly 28 move away from one another, the head 112 of bumper element 78 may engage the angled extension 140 of the axle body 26 to prevent contact between it and the lower link 78.

Figure 7:
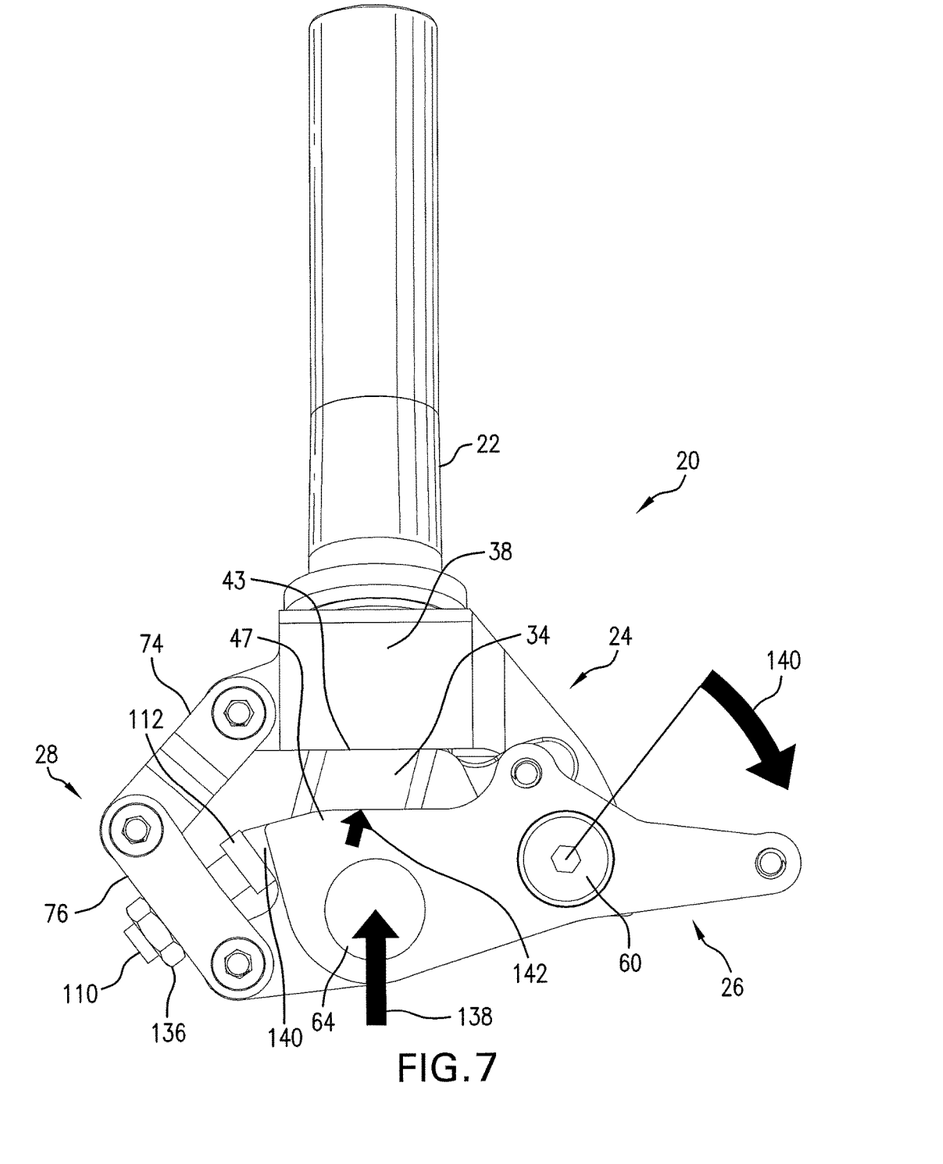
FIG. 7 is a view similar to FIG. 4 illustrating rotation of the axle body relative to the spindle body in response to engagement of the tire of the tricycle with a bump or other obstruction.
Figure 8:
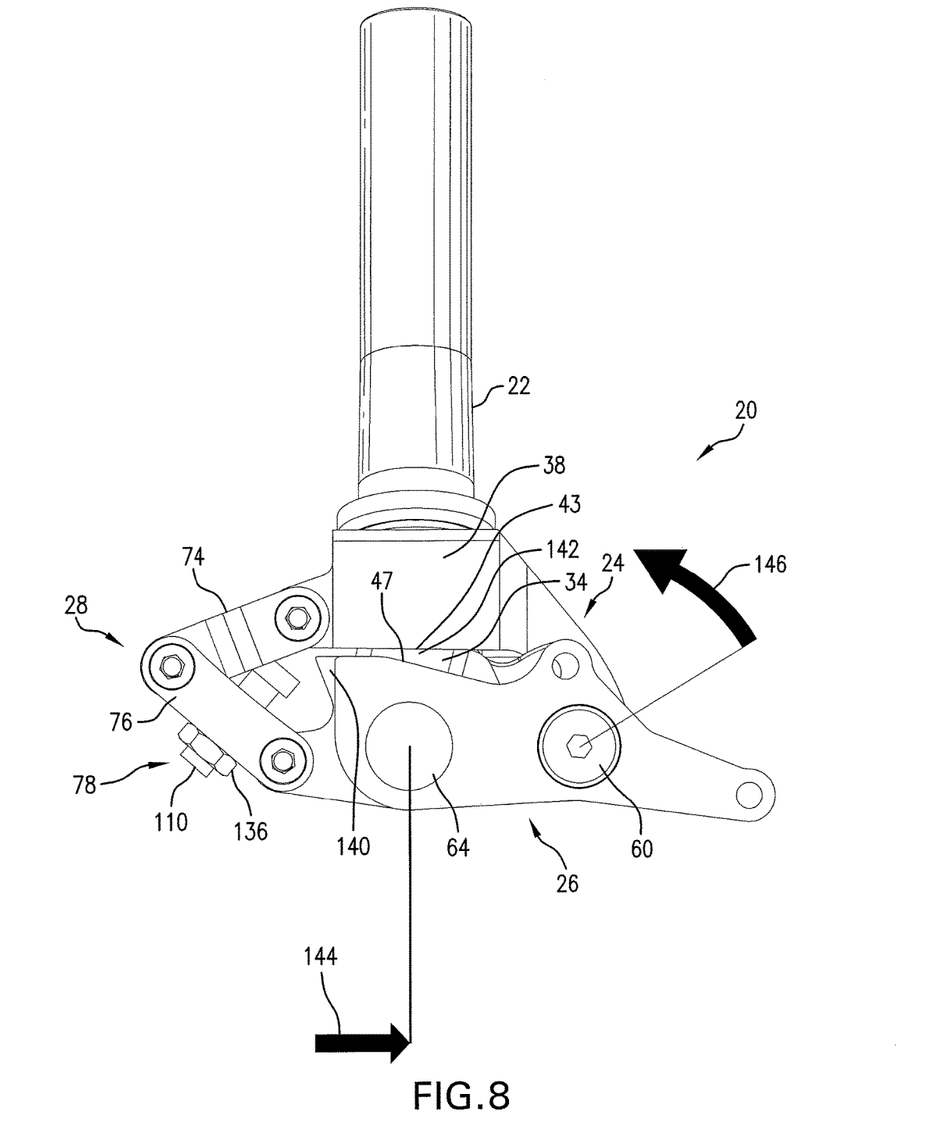
FIG. 8 is a view similar to FIG. 7 except showing rotation of the axle body relative to the spindle body as a result of braking of the tricycle.

Referring now to FIGS. 7 and 8, illustrations are provided of the movement of spindle assembly 20 in response to engagement of the tire 70 with a road surface, bump or other obstruction (FIG. 7) and in response to braking of the tricycle 10 (FIG. 8). The arrow 138 depicted in FIG. 7 is representative of a force applied to the axle 66 of the tricycle 10 through its wheel 68 in response to contact of the tire 70 with a bump or the like. This force causes the axle body 26 to rotate in a clockwise direction about the pivot shaft 60, depicted by arrow 140, such that the seat 46 and shock absorbing bumper 34 move in a direction toward the forward portion 38 of spindle body 24. See the arrow 142 in FIG. 7. The shock absorbing bumper 34 undergoes compression and functions to absorb the vibration and shock resulting from such force.

The arrow 144 shown in FIG. 8 is representative of the impulse force caused by braking of the tricycle 10. For purposes of illustration, the spindle assembly 20 is shown in a fully compressed position, as in FIG. 6, with the arrow 144 denoting the force applied at the instant braking begins. That force is transmitted through the tire 70, wheel 68 and axle 66 to the spindle assembly 20 causing the axle body 26 to rotate in a counterclockwise direction about pivot shaft 60, as illustrated by the arrow 146 in FIG. 8, after which time the spindle assembly 20 reverts to its pre-compressed position shown in FIG. 5.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A spindle assembly, comprising:
   a spindle body adapted to connect to a frame of a bicycle or tricycle;
   an axle body pivotally mounted to said spindle body such that said axle body is movable toward and away from said spindle body, said axle body being adapted to mount to an axle of a wheel of the bicycle or tricycle;

a shock absorbing body connected between said spindle body and said axle body, said shock absorbing body undergoing compression in the course of movement of said axle body toward said spindle body, said shock absorbing body being formed of an elastomeric material which exhibits progressive spring behavior wherein the rigidity of said shock absorbing body increases with increasing compression applied thereto;

a first spindle link having a first end pivotally connected to said spindle body and a second end, a second spindle link having a first end pivotally connected to said axle body and a second end, said second end of said first spindle link being pivotally connected to said second end of said second spindle link, said first and second spindle links being movable toward and away from one another in response to pivotal movement of said axle body.

2. The spindle assembly of claim 1 in which said spindle body includes a hollow sleeve and a first portion formed with a bore, said axle body being formed with spaced first and second arms each formed with a bore, said first portion of said spindle body being insertable between said first and second arms of said axle body so that said bores therein align with said bore in said first portion, a pivot shaft being insertable through said aligning bores to permit rotation of said axle body relative to said spindle body.

3. The spindle assembly of claim 2 in which said bore in said first arm of said axle body mounts a first bearing and said bore in said second arm of said axle body mounts a second bearing, said first and second bearing being connected to said pivot shaft.

4. The spindle assembly of claim 2 in which said axle body is formed with a hollow sleeve.

5. The spindle assembly of claim 4 in which said second spindle link is formed with spaced side plates connected by a center plate formed with a bore, a first end of each of said side plates being formed with a bore, said side plates of said second spindle link being positioned relative to said axle body so that said bore in each of said first ends thereof align with said hollow sleeve of said axle body.

6. The spindle assembly of claim 5 in which a pivot rod is inserted through said aligning bores in said first end of said side plates of said second spindle link and through said hollow sleeve of said axle body, said pivot rod being mounted by bushings to said side plates to permit pivoting of said second spindle link relative to said axle body.

7. The spindle assembly of claim 5 in which said first spindle link is formed with spaced side plates connected by a center plate, opposed first and second ends of each of said side plates of said first spindle link being formed with a bore, said side plates being positioned relative to said spindle body so that said bore in each of said first ends thereof align with said hollow sleeve of said spindle body.

8. The spindle assembly of claim 7 in which a pivot rod is inserted through said aligning bores in said first end of said side plates of said first link and through said hollow sleeve of said spindle body, said pivot rod being mounted by bushings to said side plates to permit pivoting of said first spindle link relative to said spindle body.

9. The spindle assembly of claim 7 in which said bore in said second end of each of said side plates of said first spindle link align with said bore in said center plate of said second spindle link, a pivot rod being inserted through said aligning bores and into bushings mounted in said bore of said center plate of said second spindle link to permit pivoting of said first and second spindle links relative to one another.

10. The spindle assembly of claim 5 further including a bumper element mounted to said center plate of said second spindle link.

11. A spindle assembly, comprising:
a spindle body, said spindle body being adapted to connect to a frame of a bicycle or tricycle;
an axle body, said axle body being adapted to connect to an axle of a wheel of the bicycle or tricycle;
a first portion of said axle body being pivotally mounted to a first portion of said spindle body such that a second portion of said axle body is movable toward and away from a second portion of said spindle body;
a shock absorbing body located between said second portion of said axle body and said second portion of said spindle body, said shock absorbing body undergoing compression in the course of movement of said axle body toward said spindle body, said shock absorbing body being formed of an elastomeric material which exhibits progressive spring behavior wherein the rigidity of said shock absorbing body increases with increasing compression applied thereto;
a spindle linkage assembly connected between said second portion of said axle body and said second portion of said spindle body.

12. The spindle assembly of claim 11 in which said elastomeric material forming said shock absorbing body is cellular polyurethane elastomer.

13. The spindle assembly of claim 12 in which said cellular polyurethane elastomer has a density of 450 kg/m$^3$.

14. The spindle assembly of claim 12 in which said cellular polyurethane elastomer has a density of 550 kg/m$^3$.

15. A spindle assembly, comprising:
a spindle body, said spindle body being adapted to connect to a frame of a bicycle or tricycle;
an axle body, said axle body being adapted to connect to an axle of a wheel of the bicycle or tricycle;
a first portion of said axle body being pivotally mounted to a first portion of said spindle body such that a second portion of said axle body is movable toward and away from a second portion of said spindle body;
a shock absorbing body connected between said second portion of said axle body and said second portion of said spindle body;
a linkage assembly pivotally connected to said second portion of said spindle body and to said second portion of said axle body;
a bumper element connected at one end to said linkage assembly, said bumper element being movable into engagement with said axle body causing said axle body to move toward said spindle body thereby applying a pre-compression to said shock absorbing body, said shock absorbing body undergoing further compression in the course of movement of said axle body toward said spindle body in response to operation of the bicycle or tricycle.

16. The spindle assembly of claim 15 in which said shock absorbing body exhibits progressive spring behavior wherein the rigidity of said shock absorbing body increases with increasing compression applied thereto.

17. The spindle assembly of claim 15 in which said shock absorbing body has a length dimension measured from said second portion of said axle body in a direction toward said second portion of said spindle body, said length dimension being decreased in response to said pre-compression applied by said bumper element.

18. The spindle assembly of claim 17 in which the extent of said pre-compression applied to said shock absorbing body by said bumper element is about twenty percent of said length dimension of said shock absorbing body.

19. The spindle assembly of claim 15 in which said shock absorbing body has one of a first density and a second density, said second density being greater than said first density.

20. The spindle assembly of claim 15 in which said linkage assembly comprises a first spindle link pivotally connected to said spindle body and a second spindle link pivotally connected to said axle body, said first and second spindle links being pivotally connected to one another.

21. The spindle assembly of claim 20 in which said second spindle link is formed with an internally threaded bore, said bumper element including a head section and a threaded shaft insertable within said threaded bore, said threaded shaft being rotatable within said threaded bore to cause said head section to contact and move said axle body in a direction toward said spindle body so as to pre-compress said shock absorbing body between said spindle body and said axle body.

22. A spindle assembly, comprising:
a spindle body adapted to connect to a frame of a bicycle or tricycle;
an axle body pivotally mounted to said spindle body in such a way that said axle body is movable toward and away from said spindle body, such axle body being adapted to mount to an axle of the bicycle or tricycle;
a shock absorbing body connected between said spindle body and said axle body;
a linkage assembly comprising a first spindle link pivotally connected to said spindle body and a second spindle link pivotally connected to said axle body, said first and second spindle links being pivotally connected to one another and movable toward and away from one another in response to movement of said axle body toward and away from said spindle body;
a bumper element connected to said second spindle link, said bumper element being movable with said second spindle link in a direction toward and away from said first spindle link, said bumper element being engageable with said axle body so as to prevent contact of said axle body with said second spindle link of said linkage assembly.

23. The spindle assembly of claim 22 in which said bumper element is formed with a head section, said head section being engageable with said axle body to prevent contact of said axle body with said second spindle link of said linkage assembly.

24. The spindle assembly of claim 23 in which said head section of said bumper element is formed of a resilient material.

25. A spindle assembly, comprising:
a spindle body adapted to connect to a frame of a bicycle or tricycle;
an axle body mounted to said spindle body in such a way that said axle body pivots about a first axis toward and away from said spindle body, said axle body being connected to an axle which mounts a wheel carrying a tire such that a plane of motion of the tire is substantially perpendicular to the ground;
a shock absorbing body connected between said spindle body and said axle body, said shock absorbing body being formed of an elastomeric material which exhibits progressive spring behavior wherein the rigidity of said shock absorbing body increases with increasing compression applied thereto;
a first spindle link connected to said spindle body and pivotal about a second axis, a second spindle link connected to said axle body and pivotal about a third axis, said first and second spindle links being connected and pivotal relative to one another about a fourth axis;
said first, second, third and fourth axes being substantially parallel to one another and substantially perpendicular to said plane of motion of the tire so that in the course of movement of said axle body toward and away from said pivot body said plane of motion of the tire remains substantially perpendicular to the ground.

26. A spindle assembly, comprising:
a spindle body adapted to connect to a frame of a bicycle or tricycle;
an axle body having spaced first and second bearings, said axle body being pivotally mounted to said spindle body by a shaft extending between said first and second bearings such that said axle body is movable toward and away from said spindle body, said axle body being connected to an axle which mounts a wheel carrying a tire of the bicycle or tricycle, a torsional force being applied to said spindle assembly in response to turning of the bicycle or tricycle;
a shock absorbing body connected between said spindle body and said axle body;
a first spindle link having spaced first and second arms each having a first end pivotally mounted to said spindle body and a second end, a second spindle link having spaced third and fourth arms each having a first end pivotally mounted to said axle body and a second end, said second end of each of said first and second arms of said first spindle link being pivotally mounted to respective third and fourth arms of said second end of said second spindle link, said first, second, third and fourth arms collectively forming a four-bar linkage structure;
said first and second bearings which pivotally mount said axle body to said spindle body and said four-bar linkage structure collectively enhancing torsional rigidity of said spindle assembly.

* * * * *